United States Patent
Biswas et al.

(10) Patent No.: US 11,750,433 B2
(45) Date of Patent: Sep. 5, 2023

(54) CREST FACTOR REDUCTION

(71) Applicant: Telefonaktiebolaget LM Ericsson (publ), Stockholm (SE)

(72) Inventors: Ashim Biswas, Sollentuna (SE); Stefan Engström, Värmdö (SE); S M Shahrear Tanzil, Nepean (CA); Rui Hou, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/636,165

(22) PCT Filed: Aug. 21, 2019

(86) PCT No.: PCT/SE2019/050767
§ 371 (c)(1),
(2) Date: Feb. 17, 2022

(87) PCT Pub. No.: WO2021/034240
PCT Pub. Date: Feb. 25, 2021

(65) Prior Publication Data
US 2022/0294678 A1 Sep. 15, 2022

(51) Int. Cl.
*H04L 27/26* (2006.01)
(52) U.S. Cl.
CPC ................ *H04L 27/2623* (2013.01)

(58) Field of Classification Search
CPC ............ H04L 27/2614; H04L 27/2615; H04L 27/2618; H04L 27/2623; H04L 27/2624
See application file for complete search history.

(56) References Cited

U.S. PATENT DOCUMENTS

| | | | |
|---|---|---|---|
| 8,619,903 B2 | 12/2013 | Schmidt et al. | |
| 8,744,009 B2* | 6/2014 | Kleider | H04L 25/03057 375/220 |
| 9,893,920 B2* | 2/2018 | Engin | H04L 27/2623 |
| 2009/0323857 A1* | 12/2009 | Singh | H04L 27/2624 375/297 |

(Continued)

OTHER PUBLICATIONS

International Search Report and Written Opinion issued in International Application No. PCT/SE2019/050767, dated May 14, 2020 (9 pages).

(Continued)

*Primary Examiner* — Siu M Lee
(74) *Attorney, Agent, or Firm* — Rothwell, Figg, Ernst & Manbeck, P.C.

(57) ABSTRACT

A method for crest factor reduction (CFR). The method includes: generating a signal, $x_s(t)$; generating a vector, $x(t)$, of size N×1 based on $x_s(t)$, wherein N>1; generating a clipping signal vector, $z(t)$, based on $x(t)$, wherein $z(t)$ is a vector of size N×1; producing a transformed signal vector, $y(t)$, based on $z(t)$, wherein $y(t)$ is a vector of size N×1; and generating an output signal vector, $x_p(t)$, based on $y(t)$ and $x(t)$, wherein generating $x_o(t)$ comprises subtracting $y(t)$ from $x(t)$ and $x_o(t)$ is a vector of size N×1.

20 Claims, 8 Drawing Sheets

(56) References Cited

U.S. PATENT DOCUMENTS

| | | | |
|---|---|---|---|
| 2011/0228872 A1 | 9/2011 | Soler Garrido | |
| 2015/0004923 A1* | 1/2015 | Beaudin | |
| 2018/0219711 A1* | 8/2018 | Laporte | H04B 7/0413 |
| 2020/0052945 A1* | 2/2020 | Kant | H04L 27/2623 |

OTHER PUBLICATIONS

Ivanov, A., et al., "Selective Tone Reservation for PAPR Reduction in Wireless Communication Systems", IEEE, (2017) (6 pages).

Song, J., et al., "A low-complexity peak cancellation scheme and its FPGA implementation for peak-to-average power ratio reduction", EURASIP Journal on Wireless Communications and Networking (2015) 2015:85 (14 pages).

ETSI TS 136 104 V14.3.0 (Apr. 2017), LTE; Evolved Universal Terrestrial Radio Access (E-UTRA); Base Station (BS) radio transmission and reception (3GPP TS 36.104 version 14.3.0 Release 14) Apr. 2017, (220 pages).

* cited by examiner

CREST FACTOR REDUCTION

CROSS REFERENCE TO RELATED APPLICATIONS

This application is a 35 U.S.C. § 371 National Stage of International Patent Application No. PCT/SE2019/050767, filed Aug. 21, 2019, designating the United States.

TECHNICAL FIELD

Disclosed are embodiments related to crest factor (CF) reduction.

BACKGROUND

Research regarding ultra-wideband radios supporting multiple bands is ongoing. The requirements for intermediate bandwidth (IBW) of 1 GHz and above are strict. Accordingly, traditional methods of radio design and implementation is cost prohibitive for such IBW. For dual-band and triple band products with IBW around 400 to 800 MHz, existing methods are still feasible with some changes. However, for IBW of 1 GHz and above the existing method require costly hardware resources. One challenging area for multiband radios is the crest factor reduction (CFR) since it is well known fact that contemporary orthogonal frequency division modulation (OFDM) has inherent drawback of high peak to average power ratio (PAPR) which demands costly power amplifier (PA) designs. Peak reduction in the signal is important requirement so that PAs saturate in downlink chains, thereby distorting the signal irreversibly before transmission. Traditionally CFR is done digitally by well-known methods of hard clipping, peak cancellation, etc (see, e.g., references [1] and [2]).

SUMMARY

Certain challenges exist. While the CFR methods described in references [1] and [2] are suitable for single or dual band radios with limited IBW, it is exponentially complex and resource intensive for multiband (e.g. penta-band) and high IBWs mainly because the combined signal has very high sampling rate (e.g. about 1.23 GHz for 1 GHz IBW). Existing methods will still perform however cost would be prohibitive because of high sampling rate. These methods work in time domain data and hence the space between the bands where nothing is transmitted is ignored for signal processing. Moreover, these methods require peak search followed by multiple filtering stages at high sampling rate as well as multiple iteration to avoid peak regrowth. Simulations have shown that 3 dB PAPR reduction from about 10.5 dB to about 7.5 dB is only possible at 5 times the Nyquist sampling rate (i.e. 10 Gsps for 2 GHz IBW).

This disclosure proposes a CFR technique that uses whitespace between the bands to distribute the clipping signal. More specifically, a filter transform is designed which operates at Nyquist rate (e.g. 2.45 Gsps for 2 GHz IBW) still achieving 3 dB PAPR reduction. The filter transform brings down the PAPR to ideally 0 dB using a least square method (LMS or its variants) in frequency domain by distributing the amplitude variations in the whitespaces between the bands.

Accordingly, in one aspect there is provided a method for CFR. The method includes: generating a signal, $x_s(t)$; generating a vector, $x(t)$, of size N×1 based on $x_s(t)$, wherein N>1; generating a clipping signal vector, $z(t)$, based on $x(t)$, wherein $z(t)$ is a vector of size N×1; producing a transformed signal vector, $y(t)$, based on $z(t)$, wherein $y(t)$ is a vector of size N×1; and generating an output signal vector, $x_o(t)$, based on $y(t)$ and $x(t)$, wherein generating $x_o(t)$ comprises subtracting $y(t)$ from $x(t)$ and $x_o(t)$ is a vector of size N×1.

The method is able to achieve PAPR reduction of about 3 dB while satisfying the error vector magnitude (EVM), adjacent channel leakage ratio (ACLR) and unwanted emission mask (UEM) as specified in 3GPP specs (see reference [3]).

BRIEF DESCRIPTION OF THE DRAWINGS

The accompanying drawings, which are incorporated herein and form part of the specification, illustrate various embodiments.

DETAILED DESCRIPTION

Figure 1:
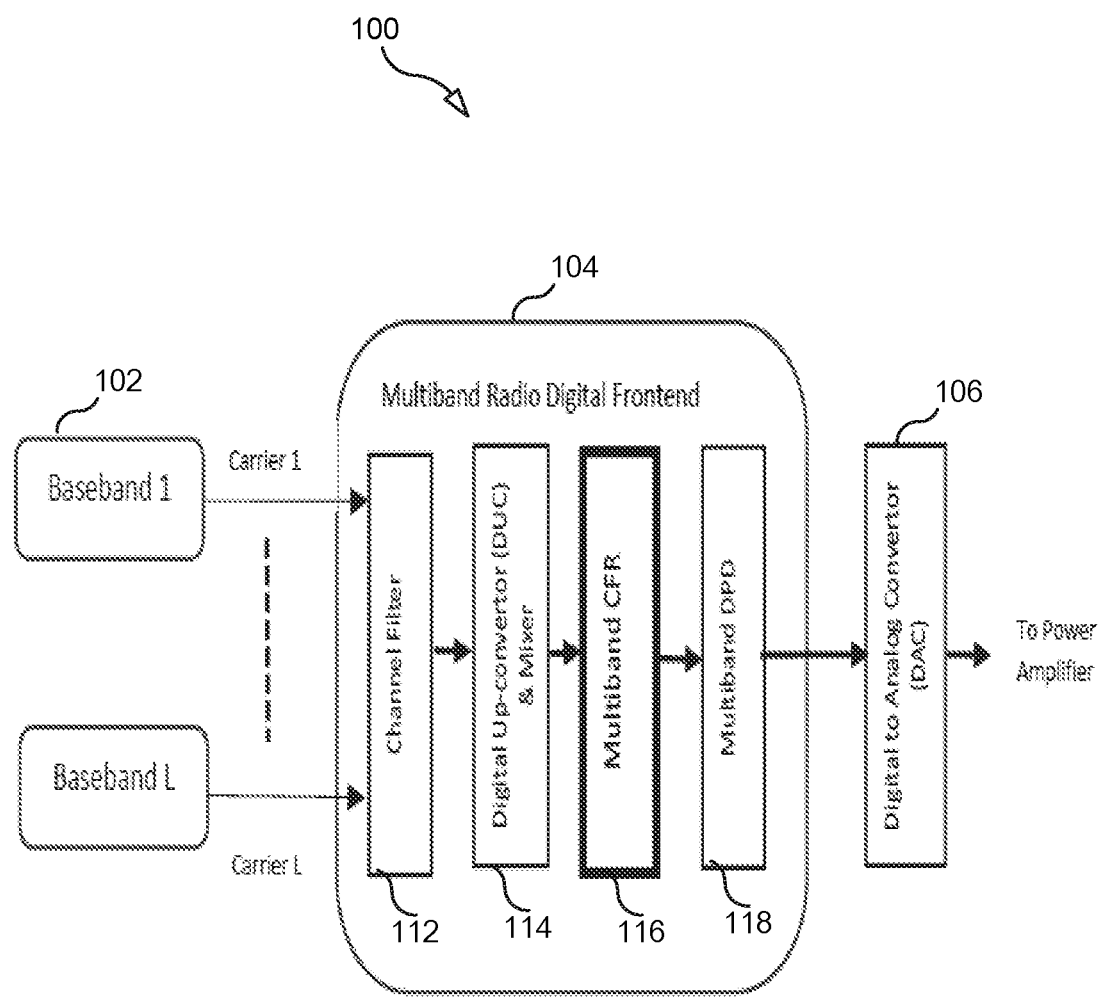
FIG. 1 illustrates a portion of a communication device.

FIG. 1 illustrates a portion of a wireless communication device 100 according to one embodiment. As shown in FIG. 1, communication device 100 includes L baseband units 102. In this example, L>1, however, in other embodiments L=1. Communication device 100 further includes a digital front-end 104 connected to a digital to analog converter 106. As illustrated in FIG. 1, digital front-end 104 includes a channel filter 112, a digital up-converter (DUC) and mixer 114, a CFR unit 116, and a digital pre-distortion (DPD) unit 118.

Figure 2:
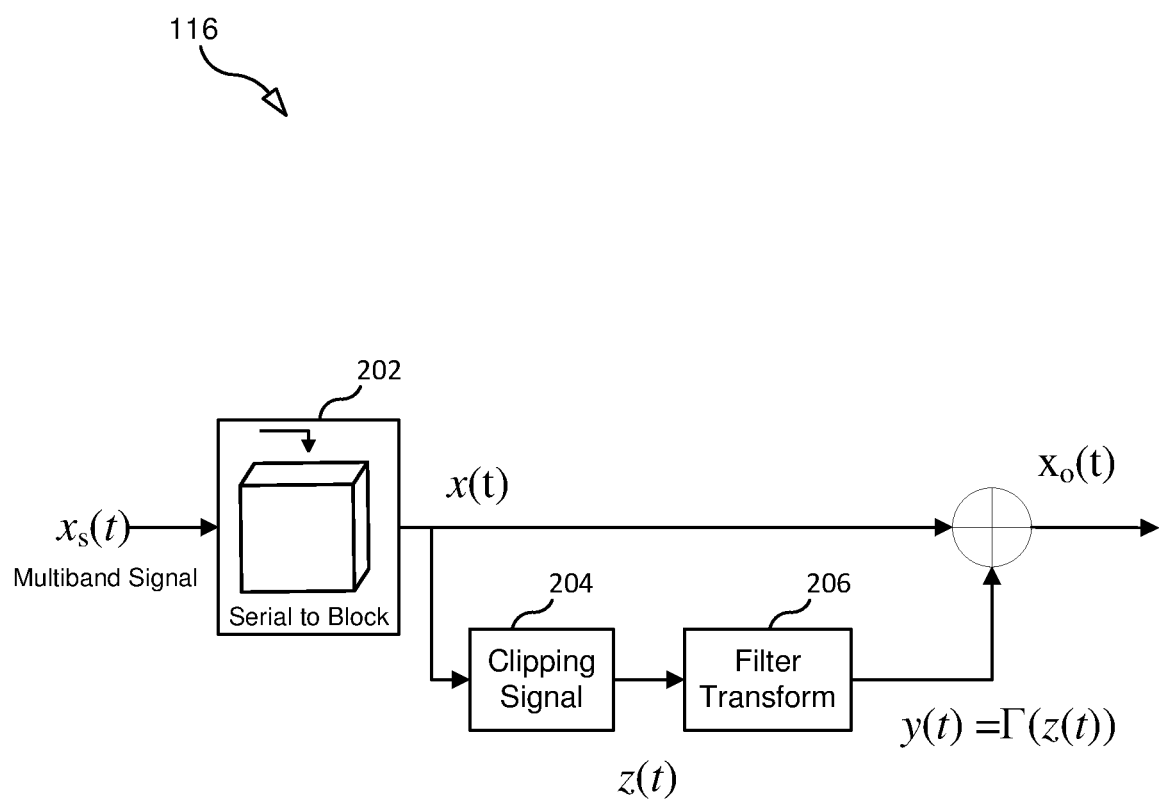
FIG. 2 illustrates a CFR unit according to an embodiment.

Referring now to FIG. 2, FIG. 2 illustrates CFR unit 116 according to an embodiment. The input serial signal (e.g., multiband and Nyquist sampled) $x_s(t)$, which in one embodiment is output by DUC 114, is first passed through serial to parallel convertor 202 to create vector x(t) of size N×1. All subsequent functions work on vectors. A clipping unit 204 generates clipping signal vector z(t) based on x(t). In one embodiment, clipping unit 204 generates z(t) such that:

$$z(t) = x(t) - e^{i\, arg(x(t))}, \qquad \text{Eq. (1)}$$

where arg(x(t)) is the argument of x(t). The clipping signal z(t) is then input to the filter transform 206 and the output of the filter transform is y(t), where y(t)=Γ(z(t)). The output of the filter transform, y(t), is subtracted from the original signal to create a lower PAPR signal $x_o(t)$. Note that adding signal x(t) and z(t) will result in 0 dB PAPR in-band signal with only phase information retained. While this is suitable for constant modulus modulation like BPSK, it is certainly not suitable for QAM. However approximating z(t) using out of band frequency components will have minimal effect in in-band components while reducing PAPR.

The Filter Transform Γ( )

Let X(f) be the frequency domain desired vector which will represent z(t) in frequency domain with the further constraints that some of its values to be zero (e.g., corresponding to in-band frequencies, nearby frequencies, and/or according to design specifications) so that, in one embodiment, when added to original signal x(t) there is no major in-band effect or spectral growth around the carriers. Let m denote those indices in X(f) where it should be constrained to zero values with M being the length of the vector m. The unconstrained values of x(f will be used to create signal as close as possible to z(t).

Figure 3:
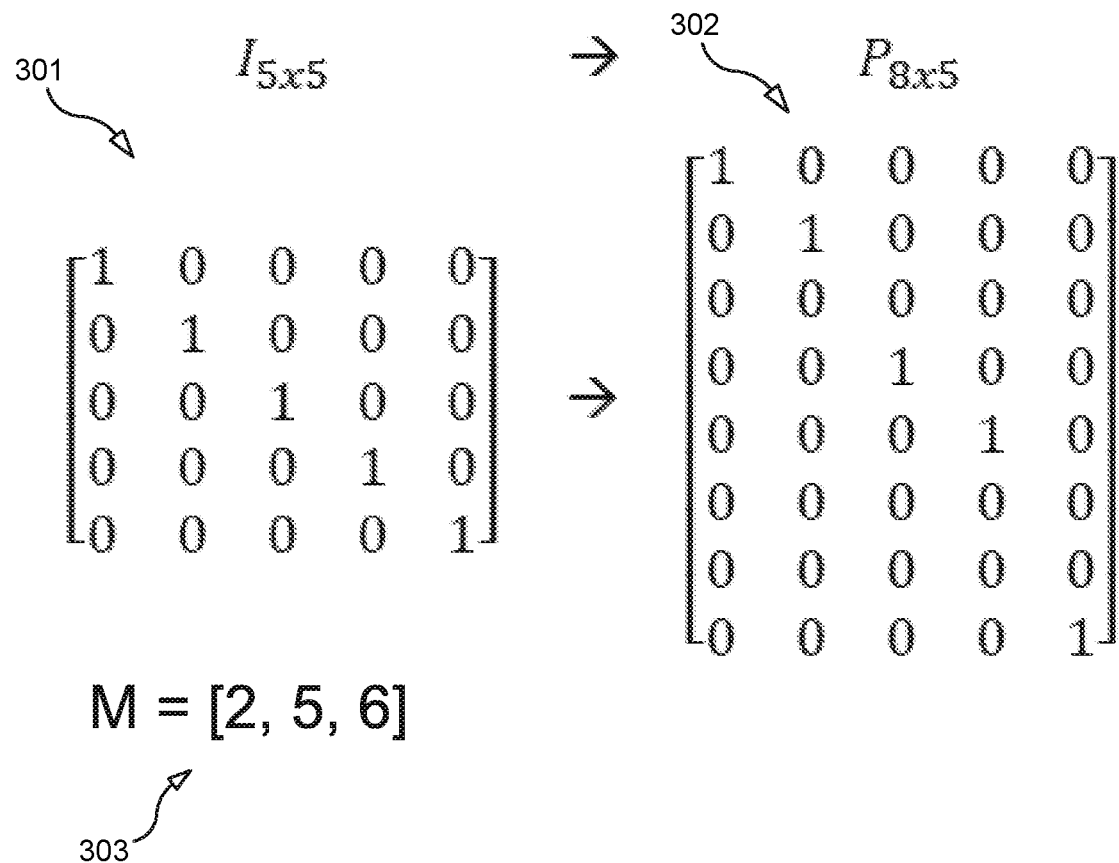
FIG. 3 illustrates a process of producing a P matrix.

An identity matrix I of size (N−M)×(N−M) is created. FIG. 3. illustrates an example I matrix 301 of size 5×5. Using matrix I and vector m, a matrix P is created of size N×(N−M), such that rows corresponding values in vector m are shifted down and replaced with a row with all zeros. FIG. 3 illustrates an example vector m 303 and the P matrix 302 of size 8×5 that is produced based on matrix I 301 and vector m 303. M such rows will be inserted.

In the example shown, vector m 303=[2,5,6]. Hence, M=3 and N=8. Given this vector m, the following rows of P will be all zero: [3,6,7]. More generically, the rows of P that will be all zero are m1+1, m2+1, m3+1, . . . where m1, m2, m3 . . . are the first, second, third . . . values of vector m. That is, using vector m 303 as an example, one starts with an I matrix and then one first inserts into the I matrix an all zero row after row 2 of the I matrix because m1=2. Thus, this new all zero row will now be third row of matrix P and what was originally rows three and four of the I matrix are now rows 4 and 5, respectively. Next, one inserts another all zero row after row 5 of the P matrix because m2=5. This new all zero row will now be sixth row of matrix P. Next, one inserts another all zero row after row 6 of the P matrix because m3=6. This new all zero row will now be seventh row of matrix P and the eight row of the P matrix corresponds to row 5 of the I matrix. In this way, the matrix P of size N×N−M is generated using an I matrix of size (N−M)×(N−M) and a vector m of length M.

Matrix P has the property that $P^H P = I_M$ where $()^H$ denotes Hermitian transpose, but $PP^H \neq I_M$.

If Q denotes the inverse discrete Fourier transform (IDFT) matrix of size N×N, then ideally:

$$z(t) = QX(f) \qquad \text{Eq. (2)}$$

However due to constrains, the M zero values in the vector X(f) can be removed and with the unconstrained estimated frequency vector g(f) of size (N−M)×1, the equation (2) can be written as:

$$z(t) = QP\tilde{X}(f) \qquad \text{Eq. (3)}$$

From equation (3) the estimated value in LMS sense is:

$$X(f) = P^H Q^H z(t) \qquad \text{Eq. (4)}$$

The time domain signal can be derived after inserting zeros in $\tilde{X}(f)$, and then taking Fourier transform or multiplying by DFT matrix $Q^H$. The zero insertion is same as multiplying with matrix P.

$$y(t) = Q^H P P^H Q^H z(t) = \Gamma(z(t)) \qquad \text{Eq. (5)}$$

The $\Gamma = Q^H P P^H Q^H$ transformation can be considered as filter which can be pre-computed and is independent of incoming data. Note that there could be other variations of the transform. The invention does not exclude the use of other methods like complex constrained least mean square (CLMS), normalized complex least mean square (NCLMS), stochastic gradient descent or any other similar method to solve this constrained optimization problem of finding the transformed clipping signal which has out of band frequency components while reducing the PAPR of overall wideband signal presented to the PA.

The above formulation was simulated using 5 carriers, each having BW of 15, 10, 20, 5 and 20 MHz respectively distributed over 2 GHz IBW.

Figure 4:
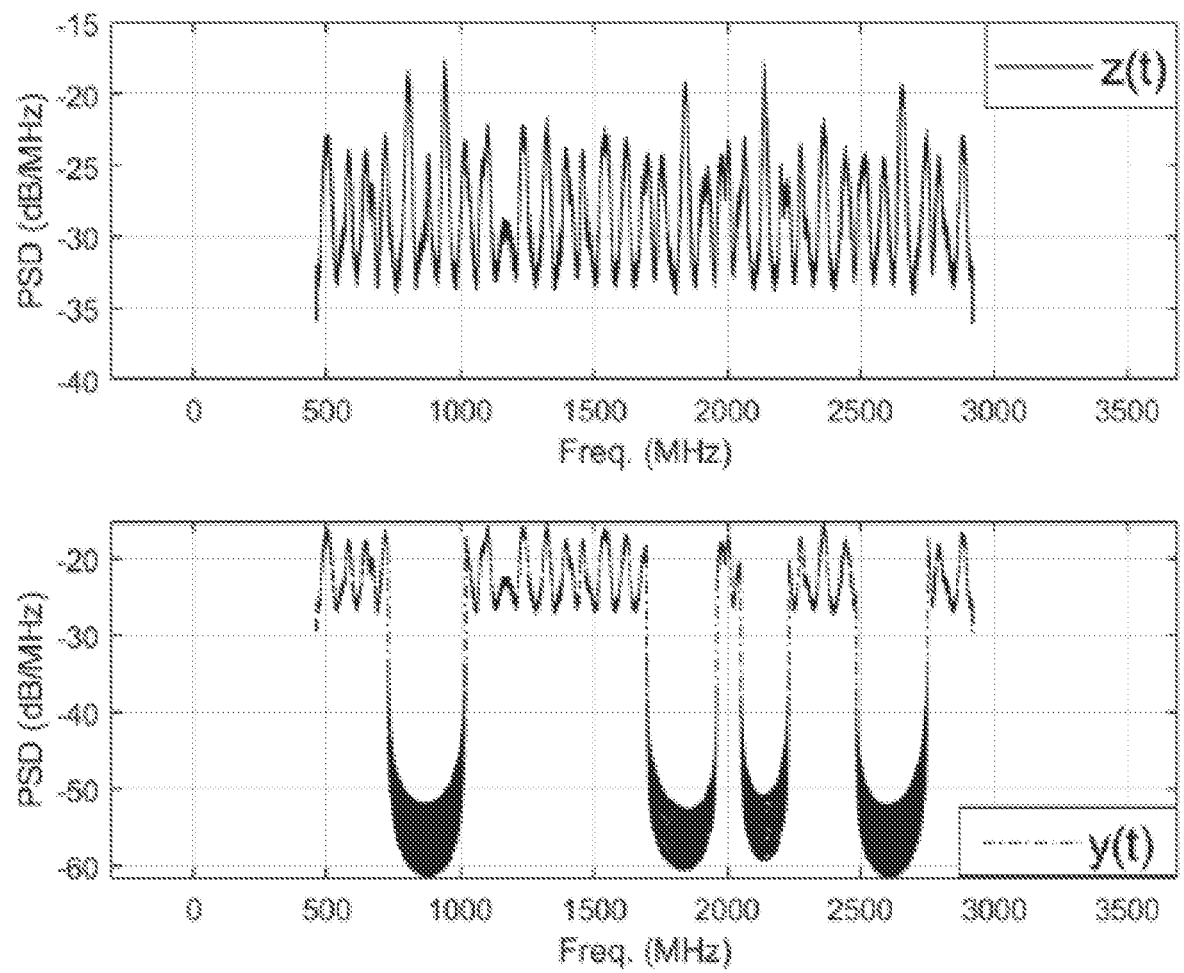
FIG. 4 shows a power spectrum density (PSD) of an intermediated clipping signal vector z(t) and proposed clipping signal vector y(t) according to an embodiment.
Figure 5:
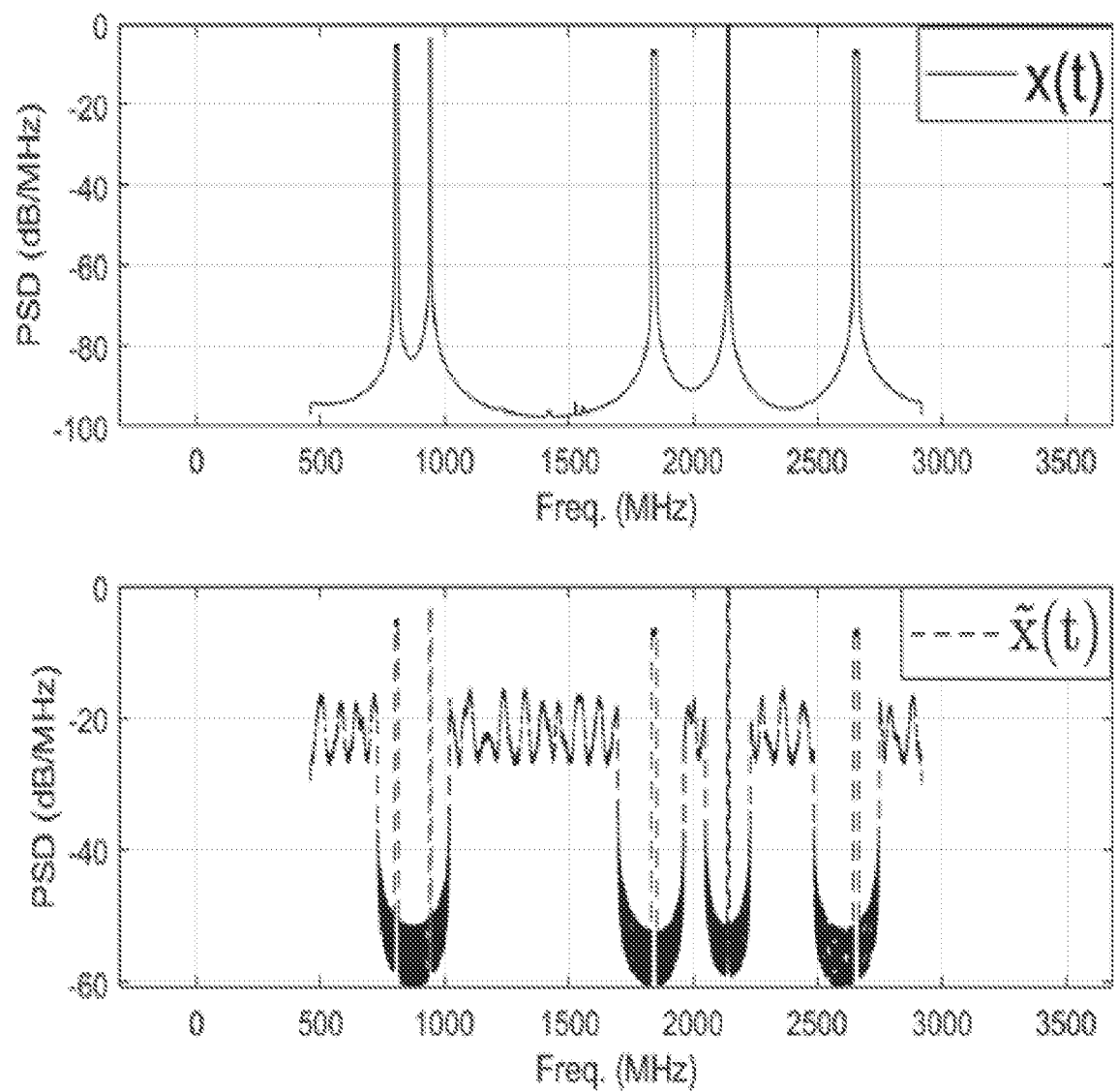
FIG. 5 shows PSD for an input signal vector x(t) and a filtered version of the input signal vector.

FIG. 4 shows the power spectrum density (PSD) of the intermediated clipping signal z(t) and proposed clipping signal y(t). As expected z(t) achieves 0 dB PAPR while distorting in-band as well as adjacent band signals. The proposed LMS filter removes in-band and adjacent frequencies from z(t) according to the 3GPP requirements. As such, y(t) only contains out of band frequency components while trying to recreate the clipping signal close to z(t). As a result, the output of the CFR, $x_o(t)$, does not distort the in-band and adjacent band signals which is shown in FIG. 5.

Figure 6:
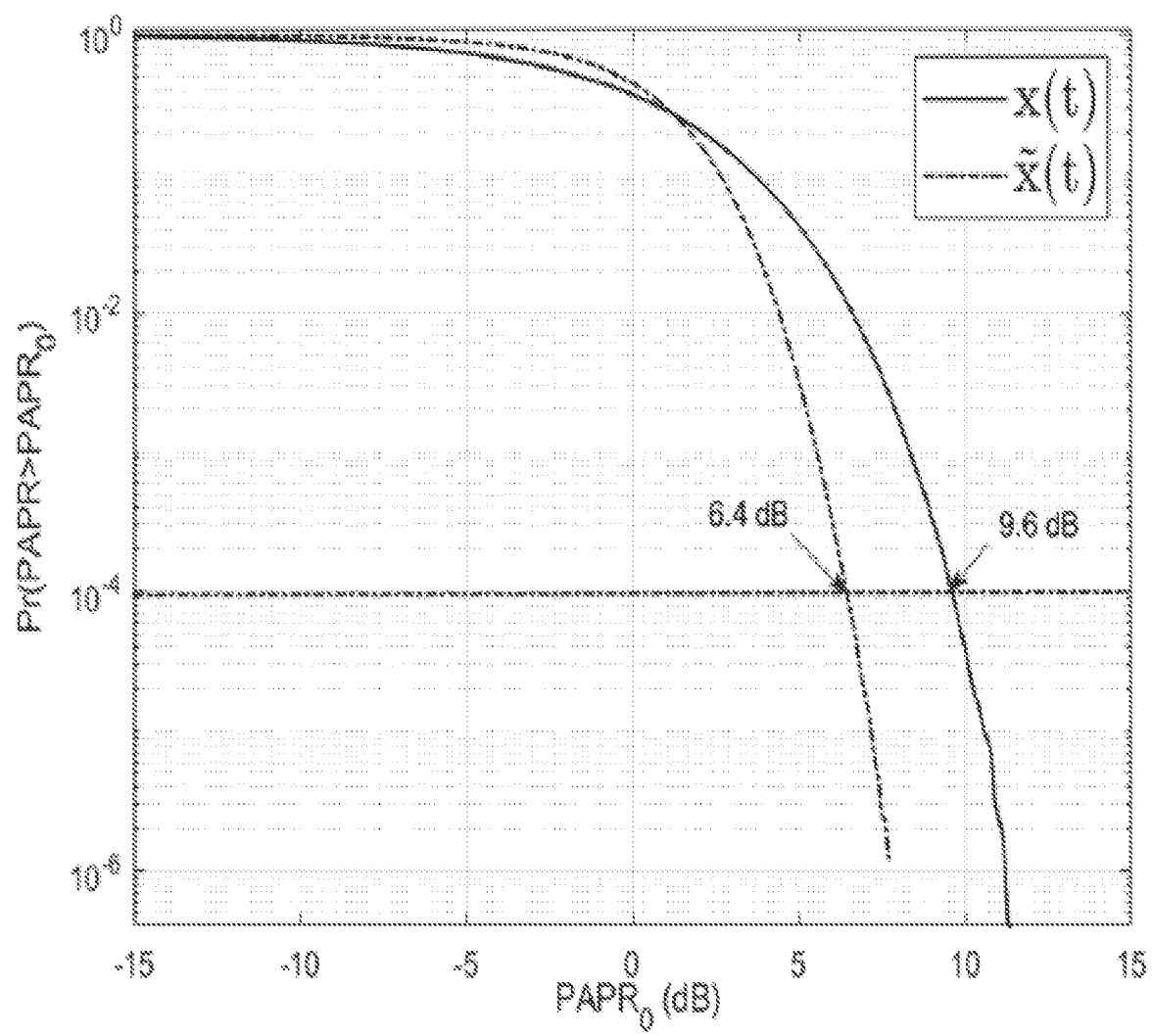
FIG. 6 shows a complementary cumulative distribution function (CCDF) curve.

FIG. 6 shows a complementary cumulative distribution function (CCDF) curve. The CCDF curve represents the probability that the PAPR exceeds a threshold. In FIG. 6 PAPR threshold is denoted by PAPR0 (dB). As common in the literature, $10^{-4}$ or 0.01% is considered as the PAPR benchmark which denotes that the PAPR of the signal does not exceed the threshold with probability $10^{-4}$ or 0.01%. As noted the proposed method can reduce 3 dB PAPR that is from 9.5 dB to 6.4 dB of the 5 carrier OFDM signals.

Table 1 below summaries ACLR and EVM of the output of the CFR unit 116. The proposed CFR method does not clip signals contain in-band and neighbor frequencies, and hence, satisfies EVM and ACLR requirements.

TABLE 1

| ACLR and EVM of the 5 carriers 256-QAM signals | | | |
|---|---|---|---|
| | Bandwidth | EVM (%) | ACLR (dBc) |
| Carrier: 1 | 15 MHz | 1.93 | −46 |
| Carrier: 2 | 10 MHz | 1.74 | −47.1 |
| Carrier: 3 | 20 MHz | 1.88 | −47.5 |
| Carrier: 4 | 5 MHz | 1.82 | −50 |
| Carrier: 5 | 20 MHz | 1.94 | −46 |

As the above demonstrates, the transformation filter 206 can advantageously reduce the crest factor by 3 dB. This contrasts with traditional crest factor reduction methods which mainly involves peak search and different kinds to filtering to reduce peaks while maintaining EVM. Transformation filter 206 is independent of the data and can be generated at setup time when carriers and their bandwidth are known.

Figure 7:
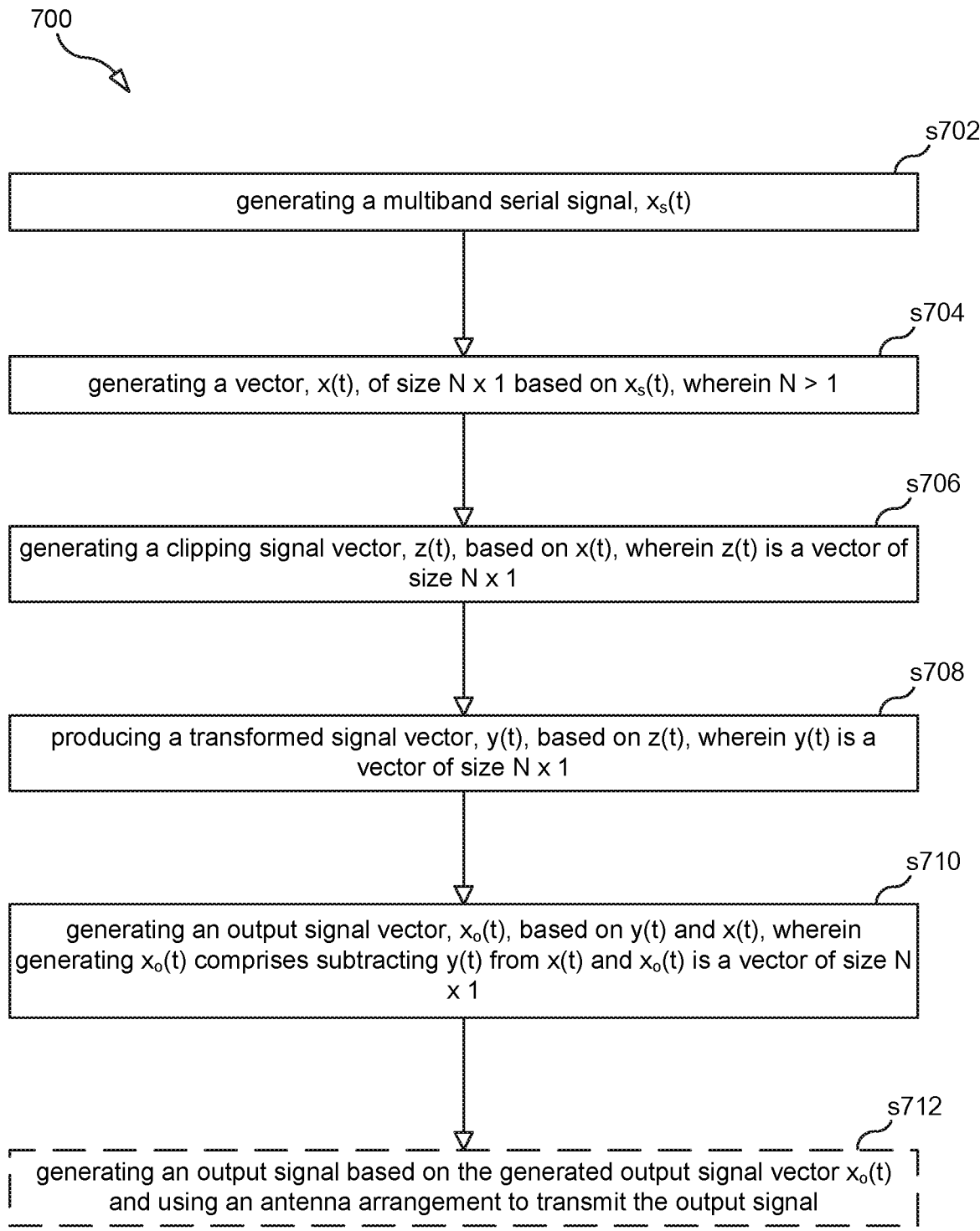
FIG. 7 is a flowchart illustrating a process according to an embodiment.

Referring now to FIG. 7, FIG. 7 is a flowchart illustrating a process 700 according to an embodiment. Process 700 may begin in step s702.

Step s702 comprises generating a signal, $x_s(t)$. In some embodiments, $x_s(t)$ is generated by DUC 214. In some embodiments, signal $x_s(t)$ is a multiband serial signal.

Step s704 comprises generating a vector, x(t), of size N×1 based on $x_s(t)$, wherein N>1.

Step s706 comprises generating a clipping signal vector, z(t), based on x(t), wherein z(t) is a vector of size N×1. In some embodiments, generating z(t) based on x(t) comprises calculating: $z(t) = x(t) - e^{i \, arg(x(t))}$, where arg(x(t)) is the argument of x(t).

Step s708 comprises producing a transformed signal vector, y(t), based on z(t), wherein y(t) is a vector of size N×1.

Step s710 comprises generating an output signal vector, $x_o(t)$, based on y(t) and x(t), wherein generating $x_o(t)$ comprises subtracting y(t) from x(t) and $x_o(t)$ is a vector of size N×1.

In some embodiments, process 700 further includes step s712, which comprises generating an output signal to be transmitted based on the generated output signal vector $x_o(t)$ and using an antenna arrangement 849 (see FIG. 8) to wirelessly transmit the output signal. In one embodiment, generating the output signal to be transmitted comprises distorting $x_o(t)$ using DPD 218, which then produces a distorted signal, which then may be converted to an analog signal by DAC 206 and the analog signal may then be amplified using a power amplifier before being wirelessly transmitted (i.e., transmitted over-the-air (OtA)) by the wireless communication device 100.

In some embodiments, producing y(t) based on z(t) comprises producing y(t) based on a first matrix, Q, and a second matrix, P, wherein Q is an inverse discrete Fourier transform (IDFT) matrix of size N×N and P is of size N×(N−M), wherein M<N. In some embodiments, $P^H P = I$, where $P^H$ is the Hermitian transpose of P and I is an identity matrix of size (N−M)×(N−M). In some embodiments, producing y(t) comprises calculating $Q^H P P^H Q^H z(t)$ to produce y(t), where $Q^H$ is the Hermitian transpose of Q.

In some embodiments, the method further comprises generating P, where P is generated using a set of M values (i.e., matrix m), wherein each one of the M values in the set identifies a particular row of P, and P is generated such that, for each particular row of P that is identified by a value in the set, each element of the row is set to the value of zero. For example, the first value (denoted m1) identifies row m1+1 of P. P is further generated such that, for each row of P that is not identified by any value in the set of M values, one of the elements of the row is set to the value of 1 and all of the other the elements of the row are set to the value of zero. In some embodiments the method further comprises, for a given frequency domain vector, X(f), identifying a subset of the values of X(f) that should be constrained to zero; and generating the set of M values such that each one of the M values identifies one of the values in the subset.

Figure 8:
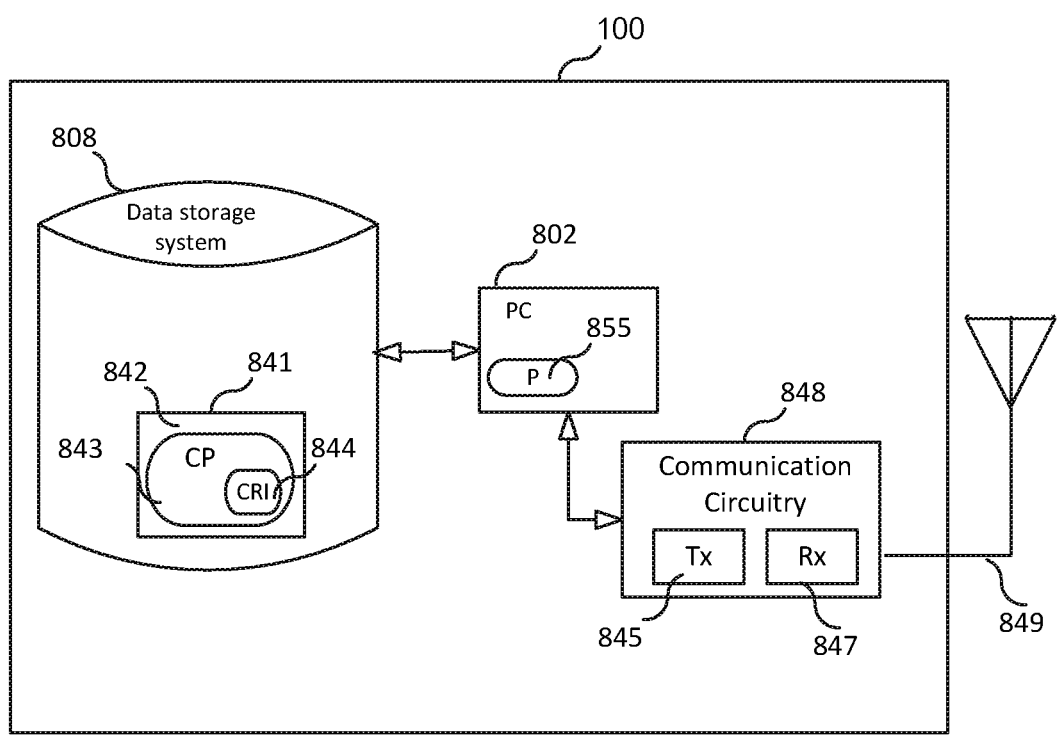
FIG. 8 is a block diagram of wireless communication device according to an embodiment.

FIG. 8 is a block diagram of wireless communication device (WCD) 100, according to some embodiments. As shown in FIG. 8, WCD 100 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like); communication circuitry 848, which is coupled to an antenna arrangement 849 comprising one or more antennas and which comprises: a) a transmitter (Tx) 845, which in one embodiment includes, among other things, the front-end 104, and b) a receiver (Rx) 847 for enabling WCD 100 to transmit data and receive data (e.g., wirelessly transmit/receive data); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes WCD 100 to perform steps described herein (e.g., steps described herein with reference to the flow charts). In other embodiments, WCD 100 may be configured to perform steps described herein without the need for code. That is, for example, PC 802 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. The indefinite article "a" should be interpreted openly as meaning "at least one" unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is inherent that a step must follow or precede another step.

REFERENCES

[1] G. Schmidt and J. Schlee. "Crest factor reduction for a multicarrier-signal with spectrally shaped single-carrier cancelation pulses". U.S. Pat. No. 8,619,903 (US). December 2013. url: https://www.google.se/patents/US8619903.

[2] Jiajia Song and Hideki Ochiai. "A low-complexity peak cancellation scheme and its FPGA implementation for peak-to-average power ratio reduction". In: EURASIP Journal onWireless Communications and Networking (2015). doi: 10.1186/s13638-015-0319-0.

[3] ETSI TS 136.104, "E-UTRA; Base Station (BS) radio transmission and reception".

The invention claimed is:

1. A method for crest factor reduction, the method comprising:
generating a signal, $x_s(t)$;
generating a vector, x(t), of size N×1 based on $x_s(t)$, wherein N>1;
generating a clipping signal vector, z(t), based on x(t), wherein z(t) is a vector of size N×1;
producing a transformed signal vector, y(t), based on z(t), wherein y(t) is a vector of size N×1; and
generating an output signal vector, $x_o(t)$, based on y(t) and x(t), wherein generating $x_o(t)$ comprises subtracting y(t) from x(t) and $x_o(t)$ is a vector of size N×1, wherein generating z(t) based on x(t) comprises calculating: x(t)× A, wherein A is a function of x(t).

2. The method of claim 1, wherein producing y(t) based on z(t) comprises producing y(t) based on a first matrix (Q) and a second matrix (P) wherein Q is an inverse discrete Fourier transform (IDFT) matrix of size N×N and P is of size N×(N−M), wherein M<N.

3. The method of claim 2, wherein $P^H P = I$, $P^H$ is the Hermitian transpose of P, and I is an identity matrix of size (N−M)×(N−M).

4. The method of claim 2, wherein producing y(t) comprises calculating $Q^H P P^H Q^H z(t)$ to produce y(t), where $Q^H$ is the Hermitian transpose of Q, and $P^H$ is the Hermitian transpose of P.

5. The method of claim 2, further comprising generating P based on a set of M values, wherein each one of the M values in the set identifies a particular row of P, and P is generated such that, for each particular row of P that is identified by a value in the set, each element of the row is set to the value of zero.

6. The method of claim 5, wherein P is generated such that, for each row of P that is not identified by any value in the set, one of the elements of the row is set to the value of 1 and all of the other the elements of the row are set to the value of zero.

7. The method of claim 5, further comprising:

for a given frequency domain vector, X(f), identifying a subset of the values of X(f) that should be constrained to zero; and generating the set of M values such that each one of the M values identifies one of the values in the subset.

8. The method of claim 1, wherein z(t)=x(t)—A, $A = e^{i \, arg(x(t))}$, and arg(x(t)) is the argument of x(t).

9. The method of claim 1, wherein $x_s(t)$ is generated by a digital up converter (DUC) and mixer.

10. The method of claim 1, further comprising generating an output signal to be transmitted based on the generated output signal vector $x_o(t)$ and then using an antenna arrangement to transmit the output signal.

11. A wireless communication device, the wireless communication device comprising:

a transmitter;

a receiver; and processing circuitry, wherein the communication device is configured to:

generate a signal, $x_s(t)$;

generate a vector, x(t), of size N×1 based on $x_s(t)$, wherein N>1;

generate a clipping signal vector, z(t), based on x(t), wherein z(t) is a vector of size N×1;

produce a transformed signal vector, y(t), based on z(t), wherein y(t) is a vector of size N×1; and generate an output signal vector, $x_o(t)$, based on y(t) and x(t), wherein generating $x_o(t)$ comprises subtracting y(t) from x(t) and $x_o(t)$ is a vector of size N×1, wherein generating z(t) based on x(t) comprises calculating:

x(t)—A, wherein A is a function of x(t).

12. The wireless communication device of claim 11, wherein the wireless communication device is configured to produce y(t) based on z(t) by producing y(t) based on a first matrix (Q) and a second matrix (P) wherein Q is an inverse discrete Fourier transform (IDFT) matrix of size N×N and P is of size N×(N−M), wherein M<N.

13. The wireless communication device of claim 12, wherein $P^H P = I$, $P^H$ is the Hermitian transpose of P, and I is an identity matrix of size (N−M)×(N−M).

14. The wireless communication device of claim 12, wherein producing y(t) comprises calculating $Q^H P P^H Q^H Z(t)$ to produce y(t), where $Q^H$ is the Hermitian transpose of Q, and $P^H$ is the Hermitian transpose of P.

15. The wireless communication device of claim 12, wherein the wireless communication device is further adapted to generate P based on a set of M values, wherein each one of the M values in the set identifies a particular row of P, and P is generated such that, for each particular row of P that is identified by a value in the set, each element of the row is set to the value of zero.

16. The wireless communication device of claim 15, wherein P is generated such that, for each row of P that is not identified by any value in the set, one of the elements of the row is set to the value of 1 and all of the other the elements of the row are set to the value of zero.

17. The wireless communication device of claim 15, wherein the wireless communication device is further adapted to:

for a given frequency domain vector, X(f), identify a subset of the values of X(f) that should be constrained to zero; and generate the set of M values such that each one of the M values identifies one of the values in the subset.

18. The wireless communication device of claim 11, wherein z(t)=x(t)— A, $A = e^{i \, arg(x(t))}$, and arg(x(t)) is the argument of x(t).

19. The wireless communication device of claim 11, wherein the wireless communication device comprises a digital up converter (DUC) and mixer is operable to generate $x_s(t)$.

20. The wireless communication device of claim 11, wherein the wireless communication device comprises an antenna arrangement for wireless transmitting an output signal generated based on the generated output signal vector $x_o(t)$.

* * * * *